(12) United States Patent
Santicchi

(10) Patent No.: US 7,731,012 B2
(45) Date of Patent: Jun. 8, 2010

(54) OVERHEAD TRANSPORT SYSTEM ABLE TO ACTIVATE THE SELECTIVE DRAWING OF GARMENT LOTS

(76) Inventor: Augusto Santicchi, Via Tommaso Albinoni, 151, I-06132 San Sisto (PG) (IT)

( * ) Notice: Subject to any disclaimer, the term of this patent is extended or adjusted under 35 U.S.C. 154(b) by 1034 days.

(21) Appl. No.: 10/558,050

(22) PCT Filed: Oct. 5, 2004

(86) PCT No.: PCT/IT2004/000551

§ 371 (c)(1),
(2), (4) Date: Nov. 22, 2005

(87) PCT Pub. No.: WO2005/035403

PCT Pub. Date: Apr. 21, 2005

(65) Prior Publication Data
US 2006/0245844 A1    Nov. 2, 2006

(30) Foreign Application Priority Data
Oct. 16, 2003   (IT) .................... MC2003A0123

(51) Int. Cl.
*B65G 43/08* (2006.01)
(52) U.S. Cl. ..................................... 198/465.4; 414/13
(58) Field of Classification Search .................. 414/13; 198/465.4, 678.1; 104/89
See application file for complete search history.

(56) References Cited

U.S. PATENT DOCUMENTS

| 4,395,954 | A * | 8/1983 | Grube | .......................... | 104/89 |
| 6,460,685 | B1 * | 10/2002 | Johansson et al. | ......... | 195/465.4 |
| 6,669,007 | B2 * | 12/2003 | Howarth | ................... | 198/678.1 |
| 2003/0079641 | A1 * | 5/2003 | Johnson et al. | ............. | 104/165 |

* cited by examiner

*Primary Examiner*—Charles A Fox

(57) ABSTRACT

Overhead transport system for the selective drawing of garment lots, making use of a box-shaped support rail (1) on which the garment hanger books (G) are hanging, inside which liftable tracks (5) are provided, through which a closed circuit chain (7) is guided. The chain being able to seize and draw the said hooks when the said liftable tracks are selectively push upwards due to to the inflation of corresponding rubber tubes (4).

9 Claims, 3 Drawing Sheets

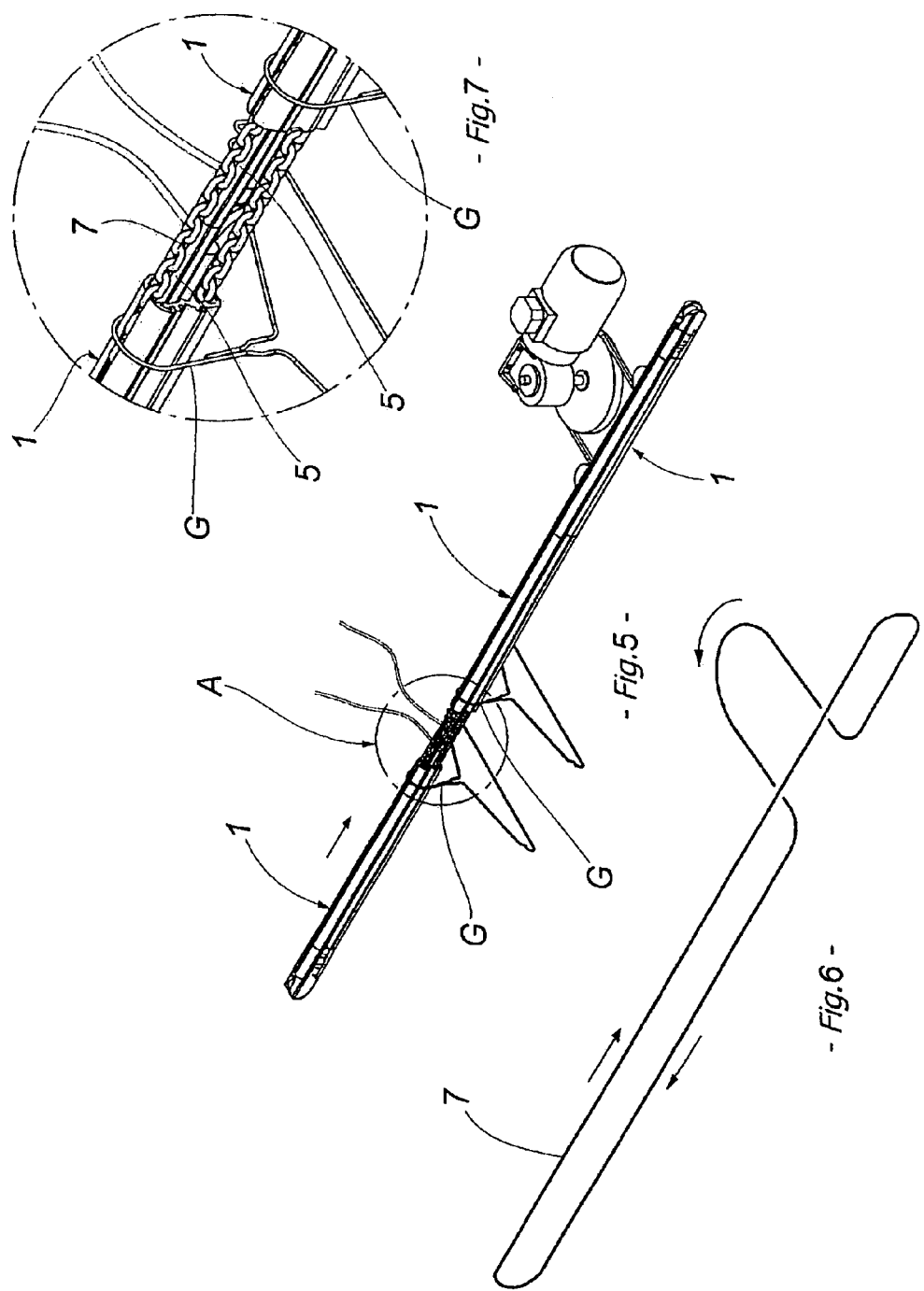

though the said rail is still rotating), but it naturally
OVERHEAD TRANSPORT SYSTEM ABLE TO ACTIVATE THE SELECTIVE DRAWING OF GARMENT LOTS

FIELD OF THE INVENTION

This patent application concerns an overhead transport system able to actuate the selective drawing of garment lots.

BACKGROUND OF THE INVENTION

It is generally known that overhead transport systems able to move forward garments hung on hangers have been used for some time; accordingly, these systems basically have the capacity of handling and drawing the hooks of the above-mentioned hangers.

However, these systems are not only used to make the garments move forward one by one; they also more and more often perform the function of sorting these garments in a predetermined order, thanks to their capacity of automatically creating selective garment lots and automatically unloading the subsequent lots that have just been created.

More particularly, the creation of the said lots is made possible by systems equipped with a rotating threaded rail, in a horizontal position, on which appropriate switch devices gradually unload the garments (hung on their hangers) for the purpose of forming every separate lot.

In this case, the hanger hooks that are supported by the said threaded rail are moved forward, precisely thanks to the rotatory motion of the rail, towards the unloading station; in this context, it is obvious that theoretically, every single hanger supported by the rail should rapidly be conveyed towards the unloading station.

Yet considering the fact that the purpose of such a system is to create garment lots (and only afterwards to perform the contemporaneous unloading of each lot), it is easy to understand why the said threaded rail is supplied with a lever which, as long as the garments are accumulating in order to form a lot, is in such a position as to interfere with the hanger hooks, obstructing their forward movement towards the unloading station.

More particularly, this lever which, when in its operational position, is placed very near the said rotating rail, has the function of intercepting the lot's first garment's hanger hook; this first hanger is therefore not only unable to move forwards (although the threaded rail is still rotating), but it naturally also holds up all the hangers of the same lot's subsequent garments that, drawn forward by the rail itself, end up by accumulating tightly behind the first hanger.

Logically, as soon as the required lot formation is complete, the above-mentioned stop lever is removed, so that the whole lot can rapidly be conveyed to the unloading station.

In this connection, it is important to note that the necessity of using the said hook stop lever is linked to the fact that the threaded rail rotation can never be stopped, as it permanently performs a twofold function: on one hand it brings together the separate garments that will then be part of the same lot, and on the other hand it unloads a lot that has been created, while another lot is simultaneously being created behind the stop lever.

In other versions of these traditional transport and sorting systems, the feature that enables the hangers to move forward and therefore the lots to be formed, in collaboration with the same stop lever, consists of a closed circuit chain which is in any case capable of making the hanger hooks which it supports continuously move forward.

However, in both the versions described above, these traditional systems are disadvantaged by some considerable drawbacks with negative effects that appear precisely when the subsequent lots are being formed, in other words when the said hanger hook stop lever is in operational position.

Indeed, the gradually increasing number of hangers that accumulate behind the said stop lever—as a consequence of the drawing action due to the threaded rail or, alternatively, to the closed circuit chain—provokes an increasing resistance which is detrimental to the rotation of the threaded rail itself or to the forward closed circuit motion of the chain itself.

All this means a particularly important stress is put on the devices that are in charge of the rail rotation or the chain forward motion which, in order to take this stress without any risk, must possibly be of a much bigger size than necessary.

Furthermore, this considerable stress put on the said systems naturally also requires a significant consumption of energy, particularly around those "peak" times that occur when the resistance to the forward motion of the systems themselves turns out to be greater because of the substantial number of hangers tightly accumulated one against the other.

SUMMARY OF THE INVENTION

This critical evaluation of these prior art arrangements gave the impulse to design the system according to this invention, with which it is believed possible to form in an efficient way lots of garments hanging on hangers without coming across the above-mentioned drawbacks: that is, without creating significant resistance to the forward motion of the system itself and without imposing a particularly high consumption of energy nor exposing the garments to the above-mentioned damaging pressure.

These goals have been achieved by equipping the system with a basically box-shaped support rail, for the purpose of defining the trajectory, which is generally horizontal, of the line of the system itself used for the formation of the lots of garments hanging on the said hangers.

The feature used for moving the hangers forward is preferably represented by a special chain with links, that runs in a closed circuit, guided and contained in the above-mentioned box-shaped support rail.

More precisely, this chain presents a regular alternation of links that are edgeways and links that are flat; this particularity creates, between two subsequent links situated edgeways, a kind of cradle formed by the link in-between, which is flat; this kind of cradle is useful for positioning and drawing the hangers' hooks.

The idea on which this invention is based provides for the chain, while continuously moving forward in a closed circuit, to either be in the condition of interfering with the hangers' hooks (and therefore in the condition of actually drawing them), or in the condition of not interfering with them (and therefore in the condition of not being able to move them forward).

Logically, the interference between the chain and the hangers is obstructed for the time necessary to form, on the above-mentioned system, every requested lot; needless to say that without this interference, the hangers are going to keep a static position on the system itself.

But as soon as the lot is complete, the said chain is put in a position that enables it to interfere with the hooks of the hangers of the lot itself; these hangers will therefore all undergo the drawing action of the chain itself, which conveys them towards an unloading station.

In order to selectively produce this interference between the hanger hooks and the chain that runs inside the system according to this invention, the chain has to vary the height of its own forward motion inside the said box-shaped support rail.

More precisely, the chain is able to run alternately along a lower trajectory in which its links do not protrude enough from the support rail to interfere with the hooks of the hangers supported by the support structure itself, and along a higher trajectory in which its links protrude enough to intercept the hooks of the hangers that have to be moved forward on the system itself.

Now, the variable height at which the chain moves forward is obtained by actually having this chain running between two appropriate liftable tracks, held one after the other in a suitable groove made on the whole length of the support rail on the system in question.

The lifting or lowering of each of these tracks can be obtained simply by inflating or deflating a rubber tube placed just below each of them; accordingly, it can be said that each of these rubber tubes serves, in relation to the respective liftable track, as a proper thickness with a variable size.

It should also be noted that the various tracks situated in the system's support rail can be lifted as described above independently from one another; the interference between the conveying chain and the hangers can therefore occur selectively in various points on the system, according to the invention, where different lots are being created.

BRIEF DESCRIPTION OF THE DRAWINGS

For major clarity the description of the invention continues with reference to the enclosed drawings, intended for purposes of illustration and not in a limiting sense, where:

FIG. 5 is an axonometric view showing the overhead transport system according to the invention;

FIG. 6 is an axonometric view showing the direction of travel of the chain of the overhead transport system of FIG. 5;

FIG. 7 is an enlarged view of the particular enclosed into the circle A of FIG. 5.

DETAILED DESCRIPTION

Figure 2:
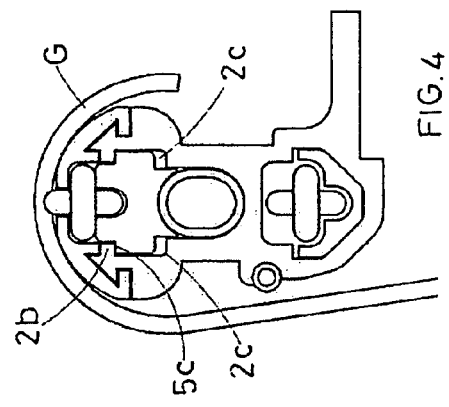
FIGS. 1 and 2 are respectively the axonometric representation and the view of a section of the support rail used on the system according to the invention, in the position taken when the drawing chain does not interfere with the hanger hooks.
Figure 1:
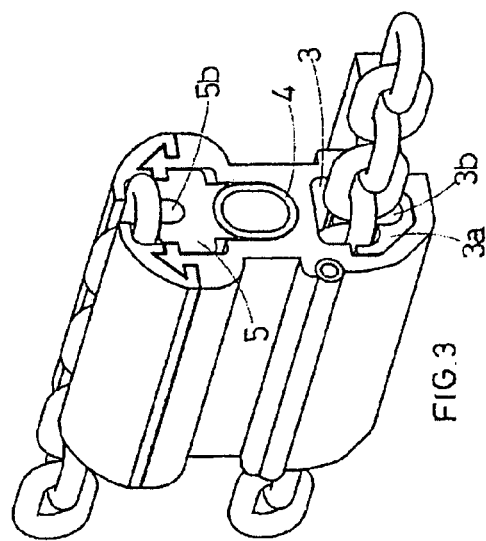

With reference to the enclosed figures, the overhead transport system in question makes use of a longitudinal support rail (1) that is attached, by means of a horizontal protruding plate (1a), to the top of appropriate upright posts fixed to the ground.

This support rail (1) has a box-shaped structure, due to the presence of two longitudinal grooves (2, 3) placed at two different heights and not communicating.

More in detail, the groove (2) that is placed above is at a higher height and presents a "U"-shaped section; while the groove below (3) is at a lower height and is closed on both sides.

Thanks to its shape described above, the groove placed above (2) is able to hold a rubber tube (4) at the bottom, while the rest of its height is taken up exactly by a liftable modelled track (5) with a kind of saddle (5a) below, which rests upon and links up perfectly with the circular profile of the said tube (4).

The opening of the said higher groove (2) is delimited by an opposed pair of modelled edges (2a) on the outside of which are applied corresponding longitudinal strips (6) made of a material with a low friction coefficient and with an curved external profile; the two strips (6) therefore lead together to the creation of a support and sliding line for the hanger hooks (G) at the top of the support rail (1); this line has a central longitudinal slot (6a) consisting of the empty space existing between the two above-mentioned strips (6).

In particular, the curved profile of the said line has been designed to take into account the regular curving of the hanger hooks (G) in order to ensure that the hooks are naturally subject to a stable and balanced centring above the line itself.

On the bottom of the lower groove (3) is placed a fixed track (3a), on the inside of which runs the lower branch of a particular closed circuit chain (7), whose higher branch runs through the above-mentioned liftable track (5).

As already mentioned, the said chain (7) consists of a regular alternation of links that are edgeways (7a) and links that are flat (7b).

Now the lower semicircumference of the different links set edgeways (7a) of the said chain (7) runs through an appropriate groove (5b) placed above the said liftable track (5), while the higher semicircumference of these links runs through the above-mentioned longitudinal slot (6a) without protruding; whereas the flat links (7b), on the other hand, remain supported, during the chain (7) running, by the edges of the above-mentioned groove (5b) of the liftable track (5).

Figure 4:
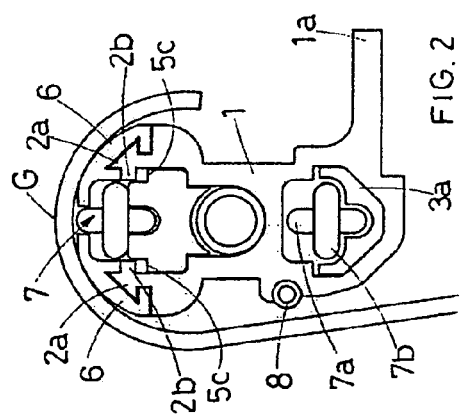
FIGS. 3 and 4 are similar to the previous figures, but they are here to show the system when the chain has to interfere with the hanger hooks.
Figure 3:
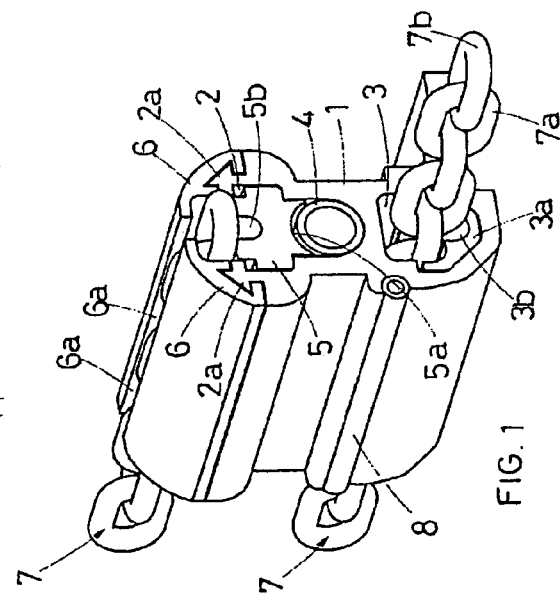
Figure 8:
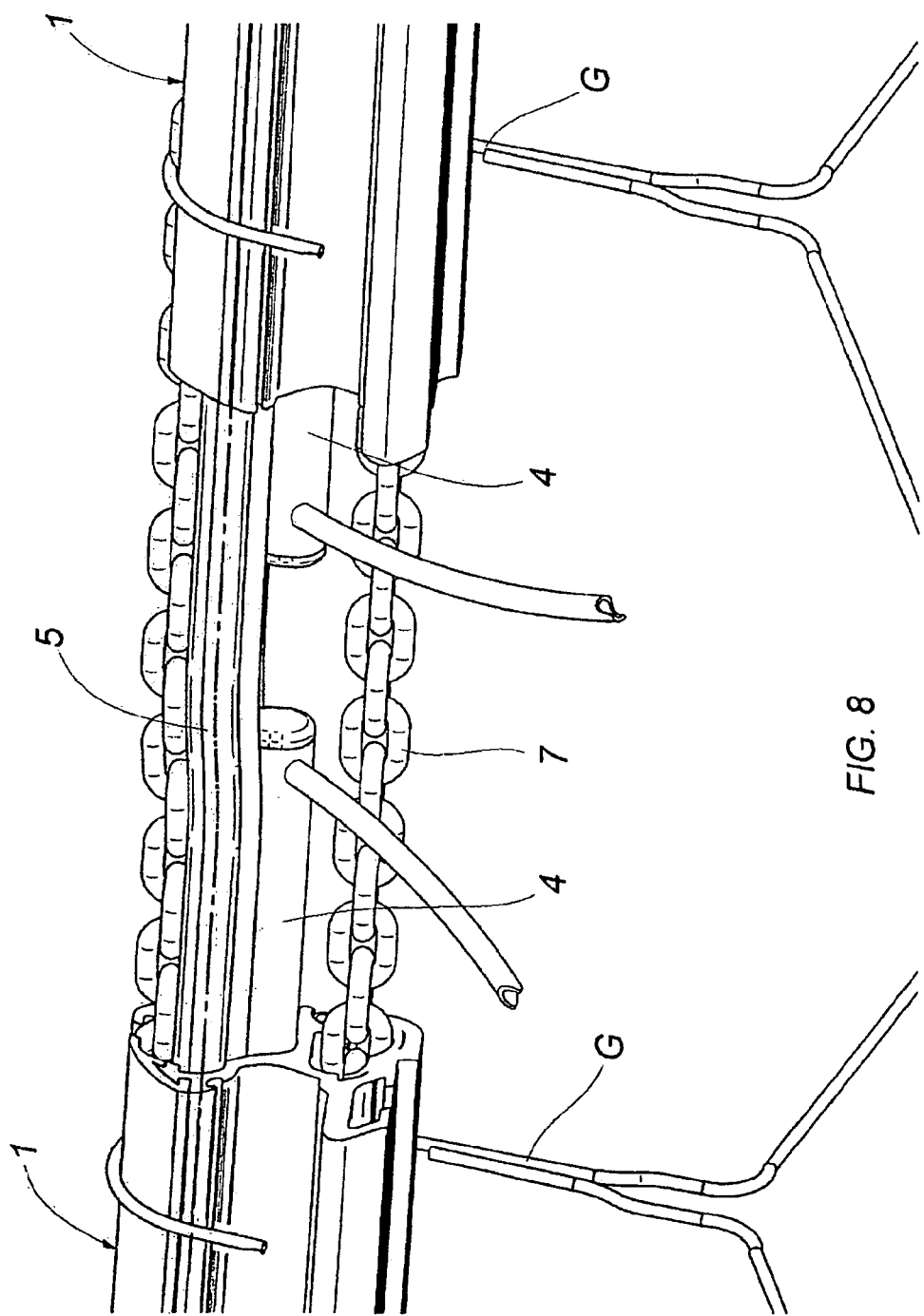
FIG. 8 is a view as FIG. 7, showing the deformation of a continuous track of the overhead transport system.

The lifting of the track (5) within the housing groove (2) occurs by inflating the tube (4) situated below; FIGS. 3 and 4 precisely show the elliptic shape of the tube section after inflation.

The lifting of each track (5) naturally provokes the increase in height of the forward motion of the chain (7) section that is running through the track itself (5), so that the higher semicircumference of the links set edgeways (7a) now protrudes from the said slot (6a) and actually interferes with the garment hooks (G) supported by the support and sliding line formed by the said strips (6), as shown more particularly in FIG. 4.

The lifting of this track (5) comes to a hault due to the presence of an opposed pair of teeth (2b) found on the inside of the said edges (2a) that delimit the groove (2), in charge of cooperating with a corresponding pair of steps (5c) found on the sides of the said track (5), as shown in FIG. 4.

There is also an opposed pair of steps (2c) on the opposed sides of the said groove (2), whose function is to stop the descent of the slide (5) after the tube (4) situated above is deflated; this prevents the weight of the groove itself (5) from resting directly on the tube (4), which is now deflated.

On the outside of the said support rail (1) is situated a longitudinal absorbing profile (8), with dimensions and distribution such as to soften the possible impacts between the subvertical section of each hanger's hook (G) and the side of the support rail itself.

It has to be reminded that along the said support rail (1) of the system according to the invention, there are actually two or more of the said liftable tracks (5) in conjunction with corresponding sections of inflatable tube (4).

This makes it possible to establish, along the whole system's line, areas in which the hanger hooks are drawn alternating with areas in which the drawing is not operational, depending on whether one or the other of the tracks is lifted or not (5); the aim is to organize in the most appropriate way the management of the garment lots that have been created and unloaded by the system itself.

Although until this point this description has always referred to a system that holds in its support rail (1) a sequence of different liftable tracks (5), each one furnished with an inflatable tube below (4), there is no reason not to carry out the same inventive idea using, as an alternative, a single continuous track (5) as long as the support rail itself (1).

In this case, the said continuous track is connected to the usual sequence of inflatable tubes (4) situated below, and is made of a slim and flexible structure, preferably in plastic; as the different tubes (4) situated below are selectively being inflated, this track is able to bend upwards only on those specific sections where the tubes (4) that are actually inflated produce an upthrust.

The plant engineering necessary to establish the selective inflation or deflation of the different tubes (4) has deliberately been left out of this description, being of a regular design.

It should finally be noted that although until this point this description has always referred to a chain (7) with alternate links, there is no reason not to use, as an alternative, also other drawing features that are able to function in the same way.

By way of an example, reference can be made to a toothed belt; in this case, the teeth could favourably interfere with the hanger hooks (G), whereas the grooves contained between two of these teeth could just as favourably hold the hooks themselves (G) while they are being drawn forward.

Clearly, the possible choice of such a toothed belt would require the fixed tracks' (3a) profile and the liftable tracks' (5) profile, that are held in the said grooves (2, 3) of the box-shaped support structure (1), to be adapted.

The invention claimed is:

1. Overhead transport system able to actuate the selective drawing of garment lots, comprising:
   a support rail (1) for a plurality of garment hangers, each hanger having a hook G, the support rail being provided, on the top, with a longitudinal groove (2), with a U-shaped section, having a bottom and sides;
   drawing means (7) that runs in a closed circuit along the support rail (1), said drawing means (7) being provided with a regular sequence of protruding features (7a) defining between them a sequence of hollows (7b) and therefore capable of interfering with hooks (G) of the hangers hanging on said support rail (1);
   one or more tracks (5) situated in said longitudinal groove (2), in order to contain and guide the forward motion of said drawing means (7), said one or more tracks (5) vertically sliding into said longitudinal groove (2) and said one or more tracks (5) being provided with a top stop abutment and a bottom stop abutment, and
   lifting means (4) disposed in the bottom of said longitudinal groove (2), under said one or more tracks (5), wherein
   said lifting means (4) being capable of lifting said one or more tracks (5) until said top stop abutment of said one or more tracks (5) abuts against a top stop abutment (2b) of said support rail, so that the protruding features (7a) of the drawing means (7) interfere with the hooks (G) of the hangers hanging on said support rail (1), and
   said lifting means (4) being capable of lowering said one or more tracks (5) until said bottom stop abutment of said one or more tracks (5) abuts against a bottom stop abutment (2c) of said support rail, so that the protruding features (7a) of the drawing means (7) do not interfere with the hooks (G) of the hangers hanging on said support rail (1).

2. System according to claim 1, wherein said system comprises a sequence of liftable tracks (5) with a rigid structure, each one of them being associated with a lifting means (4).

3. System according to claim 1, wherein said system comprises a single continuous liftable track (5), with a slim and flexible structure, associated with a sequence of lifting means (4).

4. System according to claim 1, wherein said lifting means (4) consist of tube segments (4), of circular section, placed longitudinally on the bottom of said longitudinal groove (2), capable of being inflated and deflated wherein the section profile of the tube segments are modified to alter the height of the tube segments, said one or more tracks (5) forming a saddle (5a) which cooperates with the profile of the tube segments (4).

5. System according to claim 1, wherein said top stop abutment and bottom stop abutment of the one or more tracks (5) consist of a pair of steps (5c) on the opposed sides of said track, said top stop abutment of said support rail consists of two teeth (2b), and said bottom stop abutment of said support rail consists of two steps (2c).

6. System according to claim 1, wherein said system comprises a fixed track (3a) situated in a second longitudinal groove (3) of said support rail (1) under said first longitudinal groove (2), said fixed track being totally enclosed and not communicating with the said first longitudinal groove (2), said fixed track (3a) being suitable to containing and guiding the drawing means (7) during its return travel, parallel and in opposite direction with respect to the "operational" travel wherein the drawing means (7) are delimited and contained by the said liftable one or more tracks (5).

7. System according to claim 1, wherein a top of said support rail (1) has rounded profile consisting of an opposed pair of identical strips (6) applied to the sides of the U-shaped section of said longitudinal groove (2) of the support rail (1), the strips (6) forming a longitudinal slot (6a), the longitudinal slot being only slightly wider than the protruding features (7a) of the drawing means (7).

8. System according to claim 1, wherein said support rail (1) has a longitudinal absorbing profile (8) suitable for interfering with a sub-vertical section of the hanger hooks (G) hanging on the support rail (1).

9. System according to claim 8, wherein said support rail (1) has, on the opposite side of said absorbing profile (8), horizontal plates (1a) for the connection to appropriate support means.

* * * * *